United States Patent Office 3,589,954
Patented June 29, 1971

---

3,589,954
NOVEL EPOXY CURED POLYMER BINDERS AND PROPELLANT COMPOSITIONS PREPARED THEREWITH
Harold E. Filter, Midland, and Don L. Stevens, Sanford, Mich., assignors to The Dow Chemical Company, Midland, Mich.
No Drawing. Filed June 21, 1968, Ser. No. 738,830
Int. Cl. C06d 5/06
U.S. Cl. 149—19　　　　　　　　　　　　　6 Claims

---

ABSTRACT OF THE DISCLOSURE

The present invention relates to novel elastomeric cross-linked polymers, i.e., gumstocks, prepared from reactively modified polymers cured with epoxidized diphenyl ethers and solid propellant compositions employing said gumstocks as a binder-fuel.

---

BACKGROUND OF THE INVENTION

The general area of art associated with the present invention relates to durable, elastomeric polymeric products, hereinafter referred to as gumstocks, which are substantially completely resistant to reversion upon curing. More specifically the present invention involves such polymers prepared from reactively modified polymers cured with epoxidized diphenyl ethers. These products are particularly suitable for use as sealants, adhesives and binders.

Prior to the present invention gumstocks and other compositions prepared from reactively modified polymers have often been defective in some respect. To illustrate, the use of trifunctional aziridine compounds, such as for example, tris[1-(2-methyl)-aziridinyl]phosphine oxide (hereinafter identified by the term MAPO), as curing agents for carboxyl terminated polymers has produced a product of good strength and flexibility, but said product also tends to undergo cure reversion to yield viscous, semi-liquid materials which are totally unsuited for use in rocket propellant systems where durable, elastomeric, binder-fuels are required. Epoxy-based curing agents are also known to cure carboxyl terminated polymeric binders, but the curing reaction must be catalyzed with an amine (normally a tertiary amine) and the resulting cross-linked polymeric gumstock products do not usually possess satisfactory physical properties.

It is a principal object of the present invention to provide a gumstock employing a curing agent for reactively modified polymers in general and for carboxyl modified polybutadienes in particular which gumstock compositions utilizing said reactively modified polymers are resistant to cure reversion, and also possess good physical properties such as elasticity and durability.

Another object of the present invention is to provide novel gumstock compositions which can be employed as case-bonding adhesives, automotive sealants, general adhesives, and multi-purpose elastomeric binders.

In addition, it is an object of the present invention to provide a unique polymer system suitable for use as a fuel component of a solid or hybrid propellant which is readily processable, i.e. can be easily combined with other moieties such as a particulate metal fuel, and/or an oxidizing agent, wherein the resulting mixture can be easily cast or extruded to form a predetermined shape which readily can be cured into a durable, elastomeric propellant grain.

Also, it is an object of the present invention to provide a gumstock based on reactively modified polymers and employing a curing agent which does not require a cure catalyst, such as a tertiary amine.

These and other objects will readily become apparent from the following description of the invention.

SUMMARY OF THE INVENTION

The present invention comprises a reactively modified polymeric binder cured with an epoxidized diphenyl ether as a curing agent to produce elastomeric gumstock products possessing good physical properties.

The term "reactively modified" as employed in the present application is meant to indicate polymers containing groups which will react with the epoxidized diphenyl ether curing agents employed in the present invention. Such reactive groups include carboxylate, amine hydrogen, mercaptan, and hydroxyl, as well as acid based derivatives of the carboxylate group such as, for example, carboxylic acid, ester, amide, and anhydride groups.

It should be understood that the reactive groups can either be at the ends of a reactant moiety or can be spaced periodically along the polymeric chain, or both. Those reactive groups spaced along the chain can react with the curing agent to achieve cross-linking in a manner similar to the cross-linking produced by the reactive group or groups on the end or ends of the polymer through reaction with the curing agent.

The term "reactively modified" is also meant to indicate the situation where a large number of the polymeric molecules present do not contain reactive groups but because of the relatively large number of reactive groups contained on the remaining polymeric molecules, the entire polymeric mixture acts as though each molecule was reactively modified to some extent.

The terms "gumstock" and "gumstocks" as employed in the present application define the resulting elastomeric cross-linked reaction product of polymer and curing agent. Specifically, these terms include those reaction products wherein the polymeric moiety is a polyisoprene, polyester, polyglycol, polybutadiene, or other suitable polymer, and wherein said polymer contains intermediate reactive groups spaced along the chain, or terminating reactive groups, or a combination of terminating and intermediate reactive groups.

Normally polybutadienes and polyesters are employed as the polymeric binder in the present invention. However, polyglycols, polyisoprenes and other suitable polymers also can be used. An example of a reactively modified polymeric binder particularly suited for use in the present invention is a dicarboxyl terminated polybutadiene.

When employed in the present invention, the polybutadienes can have a molecular weight ranging from 200 to about 10,000 or more. Preferably the molecular weight should range from about 1500 to about 5,000.

The epoxidized diphenyl ether curing agents which can be employed in the present invention generally contain a diphenyl ether nucleus whereupon up to about 6,1,2-epoxy-alkyl groups are substituted. The 1,2-epoxy-alkyl groups can vary from 2 to about 10 carbon atoms in size and include for example, groups such as epoxy-ethyl, glycidyl, and 1,2-epoxy-decyl.

The number of oxirane containing groups substituted on the diphenyl ether nucleus varies greatly. Generally it is very difficult and expensive to produce an epoxidized compound containing only a specified number of oxirane substituent groups per molecule. However, it has been discovered that mixtures of epoxidized diphenyl ethers can be produced wherein the average number of oxirane containing substituent groups per molecule over the entire solution can be approximately controlled. Therefore in the present application the term "functionality" has been adopted and is defined for purposes of this application as indicating the average number of epoxidized groups per molecule of diphenyl ether. To illustrate, a functionality of 2.5 indicates that the diphenyl ether molecules possess on the average 2.5 oxirane-containing substituent groups per molecule. Such a solution could be produced for example if one-half of the molecules contained 3 groups per molecule while the other half contained 2 groups per molecule; or half could contain four groups per molecule while the remaining half contained one group per molecule, or half could contain 5 substituent groups per molecule while the other half contained zero groups per molecule.

Generally, in the present invention an epoxidized diphenyl ether is employed wherein the functionality as defined above, ranges from about 1.2 to about 5. Preferably the functionality ranges from about 2 to about 3.

The relative quantities of curing agent and polymeric binder to be employed in the preparation of the present novel gumstocks can be expressed by the ratio of the epoxide equivalent of the curing agent/reactive group equivalent of the polymeric binder.

The "epoxide equivalent" for a given curing agent is the gram molecular weight per oxirane group present in the molecule. This readily can be determined by dividing the molecular weight of the compound by the average number of oxirane substituent groups present in the molecule.

The "reactive group equivalent" of the polymeric binder component in turn is the gram molecular weight per reactive group, i.e. for example carboxyl, hydroxyl, mercapto or amino group, present in the compound. This latter equivalent readily is determined by dividing the molecular weight of the polymer by the number of reactive groups present therein.

In general, the epoxide equivalent/reactive group equivalent ratio ranges from about 0.5 to about 2 and preferably from about 0.75 to about 1.5.

Initially in preparing the polymeric gumstock composition of the present invention, the binder polymer and curing agent are mixed together, cast or extruded into a predetermined shape, and cured by heating at from about 20° to about 150° C. for from about 0.5 to about 50 hours to produce an elastomeric, substantially void-free product.

The cured gumstocks as defined hereinabove can be used as auto sealants, case bonding adhesives, and general adhesives. As an automotive sealant, the uncured composition which is plastic in nature, can be placed around a windshield, for example, so that upon curing, the resulting, durable gumstock effectively seals the joint between the windshield thereby preventing water, air, and other substances from entering the car. Since the gumstock is not affected by wide temperature variations, it does not tend to crack or erode as do some presently employed temperature sensitive sealants.

As an example of the curing process, the gumstock by itself could be employed as a sealant around an automobile window, and could be cured to form a durable waterproof seal by use of a heat lamp such as those commonly used to dry the enamel finish on an automobile.

Gumstocks of the present invention can also be employed as binder-fuels in solid propellant compositions.

The term "solid propellant composition" as used herein indicates both those compositions which contain active agents to be dispersed into the atmosphere such as, for example, fumigants, herbicides, fungicides, smoke dye particles, and pyrophoric flare materials as well as solid or hybrid grains used to provide the thrust which propels a rocket or missile.

These solid propellant compositions can be prepared by adding to the uncured gumstock composition an oxidizer, a fuel, and optionally the other ingredients employed in propellants, pyrotechnics, munitions, flares, and the like devices. The resulting blend is a material of a viscosity which can be easily cast or extruded into a predetermined form and cured at moderate temperatures to yield a solid, durable, elastomeric solid propellant fuel grain.

Fuel components suitable for use in the solid propellants of the present invention include, for example, many of the light metals such as, for example, aluminum, beryllium, magnesium, lithium, boron, and alloys thereof. Metallic hydrides such as, for example, (beryllium hydride) lithium hydride, magnesium hydride, the boron hydrides and other light metal hydrides also can be employed as fuels.

Oxidizers which are operable in the solid fuel formulations of the present invention are those materials commonly employed in such compositions and including for examples inorganic oxides, and alkali metal or ammonium salts, in particular the -chlorates, -perchlorates and -nitrates, and mixtures thereof.

When a solid propellant formulation of the present invention is to be employed in a rocket or missile to produce thrust, the gumstock binder comprises from about 3 to about 40 percent of total formulation weight. The amounts of fuel and oxidizer present will vary from about 1 to about 90 percent by weight of oxidizer, and from about 1 to about 90 percent by weight of fuel.

The gumstocks of the present invention also can be employed in hybrid solid propellant systems. Such hybrid systems are defined, for purposes of the present invention, as including systems wherein fuel is admixed with the gumstock, but no oxidizer component is added. The resulting blend, minus oxidizer, is cured and inserted into the rocket assembly where it is combined, at the appropriate time with an external oxidizing agent. Suitable external oxidizing agents include, for example, liquid peroxides and nitrogen tetroxide.

Additionally, as indicated hereinbefore, the gumstocks can be employed as a binder fuel in pyrotechnic disseminating munitions. In such compositions, the gumstock is combined with agents to be burned or dispersed such as, for example, flare producing compounds, psychotomimetic incapacitating agents, insecticides, herbicides or fungicides along with an oxidizing agent and a commonly employed low-burning, gas-generating auxiliary fuel such as thiourea, thiuram disulfide, thiosemicarbazide, aminonitroguanidine, and dithiobiurea.

The exact percentage compositions for disseminating formulations of the types described hereinabove varies depending upon the nature of the reagent to be dispersed, the type and amount of fuels, and the type and amount of oxidizers to be employed. The percentage of gumstock binder in the total formulation weight varies from a minimum where the cured product tends to physically disintegrate from lack of adhesion of the components, to a maximum where the agent to be disseminated or the thrust desired from a propellant is detrimentally affected because of the amount of gumstock binder present.

To cure propellant and/or munition dissemination compositions employing the gumstock binder system of the present invention, heating the compound in the range of temperatures from about 25° C. to about 90° for from about 1 to about 48 hours provides a product possessing the desirable physical properties described hereinabove. Where the product involves components such as large amounts of oxidizer, which are not stable at temperatures of about 80° C. and above, the maximum cure temperature should be about 50° C.

DESCRIPTION OF PREFERRED EMBODIMENTS

A preferred embodiment of the present invention is the cross-linked polymeric gumstock product consisting of a carboxyl terminated polybutadiene with a molecular weight of from about 1500 to about 5000, and an epoxidized diphenyl ether having a functionality ranging from about 2.0 to about 3.0, and wherein the oxirane-containing alkyl substituent group is the epoxy-ethyl group. For elastomeric gumstock products, the epoxide equivalent/ carboxylate equivalent ratio should range from about 0.75 to about 1.5.

Generally, epoxidized diphenyl ethers can be prepared by reacting chloroalkylated diphenyl ethers with dimethyl sulfide to produce an epoxidized diphenyl ether product of predetermined functionality as set forth hereinbefore. For example, to prepare an epoxy-ethylated diphenyl ether with a functionality of two, theoretically a chloroalkylated diphenyl ether with a functionality of 2 would be reacted with dimethyl sulfide. In practice, the functionality of the chloroalkylated diphenyl ether should be slightly greater than 2 due to the fact that the reaction with dimethyl sulfide does not replace chloroalkyl groups quantitatively with oxirane terminated alkyl groups.

To prepare an epoxy-ethylated diphenyl ether with a functionality ranging from about 2.0 to about 3.0, it is necessary to employ a chloromethylated diphenyl ether wherein the chlorine content varies from about 31 to about 34 percent by weight of said chloromethylated diphenyl ether. Usually, the chloromethylated diphenyl ether is reacted with dimethyl sulfide in the presence of water at about 45° C. for about 8 hours. The reaction product is dissolved in an aqueous solution of formaldehyde and a liquid hydrocarbon, e.g., toluene is added, and the resulting mixture is agitated and heated to about 50° C. An aqueous solution of about 0.5 percent sodium hydroxide is added and the mixture is agitated again for about 10 to about 30 minutes. The mixture is allowed to stand at room temperature whereupon the epoxy product-containing toluene layer rises to the top of the mixture and can be separated and vacuum dried, usually in the presence of a desiccant such as, for example, substantially anhydrous magnesium sulphate ($MgSO_4$).

To prepare a gumstock product from the composition of the present invention, the epoxy-ethylated diphenyl ether is mixed with a carboxyl terminated polybutadiene (CTPB). The resulting mixture usually is agitated until it becomes homogeneous after which it is cast or extruded into a predetermined shape and cured for about 2 to about 50 hours at about 20° C. to about 80° C.

A particularly useful embodiment employing the gumstock of the present invention is a solid propellant fuel system wherein from about 10 to about 20 percent by weight is the CTPB and epoxy-ethylated diphenyl ether gumstock/system described directly hereinabove as a fuel-binder and from about 50 to about 75 percent by weight is an alkali metal or ammonium perchlorate oxidizer (preferably ammonium perchlorate), and the balance is a particulated aluminum fuel.

The above described solid propellant composition usually is fabricated by blending together the CTPB and the epoxy-ethylated diphenyl ether at about 40° C. to about 60° C. Thereafter, the aluminum fuel and the oxidizer are mixed with the polymer-curing agent system to form a homogeneous blend and the so-formed blend is then cast or extruded into the predetermined shape and cured from about 40 to about 50 hours at from about 50° C. to about 80° C. The so-cured product is a durable, substantially void-free, smooth-burning solid propellant grain which exhibits excellent elasticity and tensile strength.

In fabricating the above-described solid propellant a bi- or trimodal system of particulate oxidizer can be employed to improve the viscosity of the pre-cured solid propellant blend. By employing oxidizers consisting of a mixture of coarse (i.e. about 400 to about 600 microns), medium (i.e. about 60 to about 300 microns) and small (i.e. about 4 to about 40 microns) size particles in about equal quantities, a blend of excellent viscosity and processability is achieved.

Optionally, a maximum of about 1 percent by weight of an anti-caking agent, such as calcium phosphate for example, can be included to improve processability of the solid propellant blend.

The following examples will serve to further illustrate the present invention but are not intended as limits thereto.

EXAMPLE 1

A gumstock sample product of the present invention was prepared by thoroughly mixing about 60 grams of a dicarboxyl terminated polybutadiene (molecular weight approximately 3500) with about 5 grams of epoxy-ethylated diphenyl ether wherein the functionality of said epoxy-ethylated diphenyl ether was about 2.3.

The mixture of polybutadiene binder and epoxy-ethylated diphenyl ether curing agent was heated to about 80° C. under a reduced pressure of about 1 inch of mercury to free the mixture of substantially all gas entrapped therein. The so-degassed mixture was poured into a glass baking tray and cured at about 80° C. for about 48 hours thereby to produce a cured gumstock product.

Using standard test procedures and a conventional tensile test apparatus at room temperatures, the so-cured product was found to possess a tensile strength of about 120 pounds per square inch when pulled at a rate of 20 inches per minute crosshead, and an elongation of about 230 percent when pulled at a rate of 20 inches per minute crosshead. Identical tests were conducted at about minus 112° F. and the tensile strength was about 2,790 p.s.i., and the elongation was about 362 percent.

EXAMPLE 2

Following substantially the same procedure as that described directly hereinabove in Example 1, other gumstock samples were prepared in which the polymeric binder used was a substantially dicarboxyl terminated polybutadiene of about 3500 molecular weight. In these studies, the functionalities of the different epoxy-ethylated diphenyl ether curing agents employed were varied. Standard elongation and tensile strength tests were carried out at room temperature and at minus 112° F.

As a control, a dicarboxyl terminated polybutadiene polymer of about 3500 molecular weight was cured with MAPO and similarly tested. The data from the various tests are summarized in Table I.

TABLE I

| Polymer | Approximate functionality of curing agent | Tensile strength in p.s.i. at about 20° C. | Percent elongation at about 20° C. | Tensile strength in p.s.i. at about −112° F. | Percent elongation at about −112° F. |
| --- | --- | --- | --- | --- | --- |
| Run No.: | | | | | |
| 1 ............... CTPB | 2.28 | 108 | 119 | 2,565 | 175 |
| 2 ............... CTPB | 2.22 | 139 | 159 | 4,325 | 345 |
| Control ........ MAPO | ............ | 118 | 204 | >2,200 | >460 |

The results summarized in Table I establish that the epoxy-ethylated diphenyl cured gumstock products of the present invention have physical properties equal to or better than those of the MAPO cured dicarboxyl terminated polybutadiene gumstocks. Storage of the MAPO cured gumstock leads to reversion while the product of the present invention show substantially no reversion upon storage.

EXAMPLE 3

About 88.30 grams of dicarboxyl terminated polybutadiene, about 7.68 grams of epoxy-ethylated diphenyl ether, and about 96 grams of particulate aluminum fuel were blended together until a homogeneous blend resulted. To the so-formed blend was added about 408.0 grams of trimodal particulate ammonium perchlorate. The resulting mixture was agitated until a homogeneous blend resulted whereupon the homogenized mixture was cast into a standard JANAF type solid propellant grain mold and cured at about 80° C. for about 48 hours. The resulting solid propellant composition was cut into thin samples about 1/16-1/8 inches thick.

The JANAF type mold was employed to insure the comparability of test results produced from samples of the solid propellant formulation of the present invention with other solid propellant formulations, since it is generally accepted in the propellant art that shape of sample has an effect on physical properties of the cured grain.

As controls, other solid propellant samples were prepared in the JANAF type-mold wherein MAPO was employed as curing agent for dicarboxyl terminated polybutadiene instead of the epoxidized diphenyl ether. The MAPO cured samples contained the same fuel, oxidizer and polymer-binder in the same weight proportions as did said epoxy cured samples and were fully identical in weight and physical size thereto.

The percent elongation and tensile strength of the cured samples were determined using the standard test procedures described in Example 1 with the exception that the strain rate was 2.0 inches/min. The data and results of this study are summarized in Table II.

TABLE II

| | Physical properties | | | |
| --- | --- | --- | --- | --- |
| | Room temperature | | −112° F. | |
| Curing agent | Tensile strength, p.s.i. | Elongation, percent | Tensile strength, p.s.i. | Elongation, percent |
| Epoxy-ethylated diphenyl-ether | 122 | 18.5 | 537 | 23.8 |
| MAPO | 247 | 25.9 | 891 | 17.5 |

From the results in Table II it readily can be seen that the tensile strength of the epoxy cured solid propellants, although somewhat lower than MAPO cured solid propellants still are acceptable and suitable for use. In fact at low temperatures, the epoxy cured solid propellant is more flexible than the MAPO cured solid propellant.

The great advantage of the epoxy cured solid propellant of the present invention is demonstrated by the fact that after 2½ weeks storage at about 80° C., it was impossible to continue tests on the MAPO cured solid propellant because of the fact that the propellant grain had undergone cure reversion and had become soft and plastic, exuding liquid freely. By comparison after 2½ weeks storage, the present novel epoxy-ethylated diphenyl ether-cured dicarboxyl terminated polybutadiene containing solid propellant remained in excellent condition, i.e. was hard and showed no signs of exudation, and exhibited an elongation of 16.8 percent and a tensile strength of 154 pounds per square inch.

Various modifications can be made in the present invention without departing from the spirit or scope thereof, for it is to be understood that we limit ourselves only as defined in the appended claims.

We claim:
1. A solid propellant composition comprising:
   (a) a cross-linked reaction product of a reactively modified polymer and an epoxidized diphenyl ether curing agent with a functionality ranging from about 1.2 to about 5, wherein the (epoxide equivalent)/(reactive group equivalent) ratio ranges from about 0.5 to about 2, and wherein the polymeric moiety is a member selected from the group consisting of polyurethanes, polyglycols, polybutadienes, polyisoprenes and polyesters, and reactively modifying groups are members selected from the group consisting of mercaptan, hydroxyl, amine, carboxyl, carboxylic acid esters, carboxylic acid anhydrides, or mixtures thereof,
   (b) an inorganic oxidizer;
   (c) a fuel, and optionally,
   (d) an auxiliary gas-producing fuel and an agent to be disseminated, said agent being a member selected from the group consisting of fungicides, herbicides, fumigants, psychotomimetic incapacitating agents, and smoke dyes.

2. A solid propellant composition consisting on a weight basis of:
   (a) from about 3 to about 40 percent of a cross-linked reaction product of a reactively modified polymer and an epoxidized diphenyl ether curing agent with a functionality ranging from about 1.2 to about 5, wherein the (epoxide equivalent)/(reactive group equivalent) ratio ranges from about 0.5 to about 2, and wherein the polymeric moiety is a member selected from the group consisting of polyurethanes, polyglycols, polybutadienes, polyisoprenes and polyesters, and reactively modifying groups are members selected from the group consisting of mercaptan, hydroxyl, amine, carboxyl, carboxylic acid esters, carboxylic acid anhydrides, or mixtures thereof;
   (b) from about 1 to about 90 percent of an oxidizer which is a member selected from the group consisting of inorganic oxides, and alkali metal or ammonium chlorates, perchlorates, nitrates, and mixtures thereof;
   (c) from about 1 to about 90 percent of a fuel which is a member selected from the group consisting of aluminum, beryllium, magnesium, lithium, boron, and alloys and hydrides thereof.

3. The composition defined in claim 2 and consisting on a weight basis of:
   (a) from about 10 to about 20 percent of a carboxyl terminated polybutadiene cured with an epoxy-ethylated diphenyl ether with a functionality ranging from about 2 to about 3, and wherein the epoxide equivalent/carboxyl equivalent ratio ranges from about .75 to about 1.5,
   (b) from about 50 to about 75 percent of an alkali metal perchlorate or ammonium perchlorate as oxidizer, and
   (c) the balance is particulated aluminum fuel.

4. The solid propellant composition defined in claim 2 wherein the oxidizer consists of a particulate bi- or trimodal system of ammonium perchlorate as oxidizer.

5. The composition defined in claim 2 wherein the curing agent is a mixture of 1,2-epoxy-alkyl substituted diphenyl ethers containing up to about 6 substituent groups per molecule of diphenyl ether, and wherein said 1,2-epoxy-alkyl groups range from 2 to 10 carbon atoms in size.

6. The composition as defined in claim 2 and including up to about 1 percent by weight of calcium phosphate as an anti-caking agent.

References Cited

UNITED STATES PATENTS

| 3,305,523 | 2/1967 | Burnside | 260—46.5 |
| 3,344,003 | 9/1967 | Miranda et al. | 149—19 |
| 3,354,116 | 11/1967 | Gruver et al. | 260—41.5 |
| 3,399,088 | 8/1968 | Christian et al. | 149—19 |
| 3,419,510 | 12/1968 | Hudak | 260—18 |
| 3,467,558 | 9/1969 | Wernette et al. | 149—19 |

BENJAMIN R. PADGETT, Primary Examiner

U.S. Cl. X.R.
149—84; 424—40, 42